United States Patent [19]
Akiyama

[11] Patent Number: 5,158,640
[45] Date of Patent: Oct. 27, 1992

[54] APPARATUS FOR AND METHOD OF APPLYING PART ONTO CARTRIDGE

[75] Inventor: Noboru Akiyama, Tokyo, Japan

[73] Assignee: Dai Nippon Insatsu·K.K., Tokyo, Japan

[21] Appl. No.: 537,834

[22] Filed: Jun. 13, 1990

[30] Foreign Application Priority Data

| Jun. 13, 1989 | [JP] | Japan | 1-69359[U] |
| Jun. 13, 1989 | [JP] | Japan | 1-150792 |
| Jun. 13, 1989 | [JP] | Japan | 1-150793 |
| Jun. 13, 1989 | [JP] | Japan | 1-150794 |

[51] Int. Cl.$^5$ .............................................. B65C 9/26
[52] U.S. Cl. .................... 156/542; 156/572; 156/559
[58] Field of Search ............... 156/542, 499, 497, 556, 156/570, 572, 538, 539, 540, 541, 557, 558, 559, 563, 569; 428/40, 42

[56] References Cited

U.S. PATENT DOCUMENTS

| 1,779,425 | 10/1930 | Feybusch | 156/542 |
| 2,300,185 | 10/1942 | Von Hofe | 156/572 |
| 2,521,827 | 9/1950 | Carter | 156/572 |
| 2,651,429 | 9/1953 | Von Hofe | 156/572 |
| 3,483,059 | 12/1969 | Dinter | 156/542 |
| 4,009,070 | 2/1977 | Linmans | 156/572 |
| 4,025,382 | 5/1977 | Del Rosso | 156/542 |
| 4,267,004 | 3/1981 | Anderson | 156/542 |
| 4,288,272 | 9/1981 | Pfeffer | 156/542 |
| 4,366,023 | 12/1982 | Voltmer | 156/363 |
| 4,391,127 | 6/1990 | Matsumoto | 156/363 |
| 4,468,274 | 8/1984 | Adachi | 156/499 |
| 4,556,443 | 12/1985 | Moya | 156/542 |
| 4,585,505 | 4/1986 | Matsuguchi | 156/542 |
| 4,585,506 | 4/1986 | Matsuguchi | 156/542 |
| 4,595,447 | 6/1986 | Lindstrom | 156/542 |
| 4,613,392 | 9/1986 | Klar et al. | 156/378 |
| 4,954,203 | 9/1990 | Matsumoto | 156/363 |

Primary Examiner—Michael W. Ball
Assistant Examiner—Francis J. Lorin
Attorney, Agent, or Firm—Sughrue, Mion, Zinn Macpeak & Seas

[57] ABSTRACT

An apparatus is provided for applying a part, e.g., a guide plate, onto a cartridge. A plurality of two-sided adhesive pieces are provided on a tape and, while each piece is intermittently positioned, a part is attached thereon. The part having an adhesive piece attached to it is then attached to a cartridge. The cartridge is held in a support which is capable of rotating the cartridge upside down to allow a second part to be attached to the other side of the cartridge.

14 Claims, 9 Drawing Sheets

APPARATUS FOR AND METHOD OF APPLYING PART ONTO CARTRIDGE

BACKGROUND OF THE INVENTION

This invention relates to an apparatus for and a method of applying parts such as a guide plate for guiding the shutter of a cartridge and other members onto a cartridge.

Recently, there have appeared a lot of cartridges for accommodating optical disks or magnetic disks. Each of such cartridges has an outer shell in which a disk is received, and a shutter for opening and closing a spindle hole and a head inserting hole. In order to slide the shutter on the cartridge, the distal ends of the shutter are guided by a guide plate provided in the lateral direction of the cartridge.

Such a guide plate is applied manually to the front and back surfaces of the cartridge by using a two-surface adhesive tape piece. That is, a two-surface adhesive tape having adhesive on the front and back surfaces thereof is first cut into a plurality of adhesive pieces and each of the pieces is then applied onto the guide plate manually to form a unit of the guide plate and the adhesive piece. Thereafter, the guide plate with the adhesive piece is manually applied onto one surface of the cartridge. In general, since the guide plates are applied onto the front and back surfaces of the cartridge, the cartridge must be rotated upside down after the guide plate is attached to one surface of the cartridge.

Such a manual operation is very troublesome and needs much time to manufacture the cartridges. Further, it to the increase in cost of the cartridges.

In addition to the guide plates, there may be a case that other parts must be applied onto the surface of the cartridge. In such a case, the other parts must be manually applied onto the cartridge. Therefore, an apparatus for and a method of applying parts onto the cartridge quickly and easily with a low cost are desired.

SUMMARY OF THE INVENTION

It is an object to provide an appartus for and method of applying parts such as a guide plate for guiding a shutter and other members onto the surfaces of a cartridge easily in a short time with a low cost.

According to one aspect of the present invention, there is provided an apparatus for applying a part such as a guide plate onto a cartridge, which comprises: means for applying a two-surface adhesive piece located in a position on one surface of the part; means for supporting a cartridge in position so that the cartridge can be rotated upside down; and means for applying the part with the piece onto the cartridge held in the cartridge supporting means.

According to another aspect of the present invention, there is provided a method of applying a part such as a guide plate onto a cartridge, which comprises the steps of: preparing a tape having a support sheet, a separative sheet and a plurality of two-surface adhesive pieces disposed at an interval between the two sheets; separating the separative sheet from the support sheet with the pieces thereon while the tape is moved intermittently; applying the part onto the piece on the support sheet while the piece is located in position; separating the support sheet from the part with the piece; and applying the part with the piece onto the cartridge supported by a cartridge supporting means.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
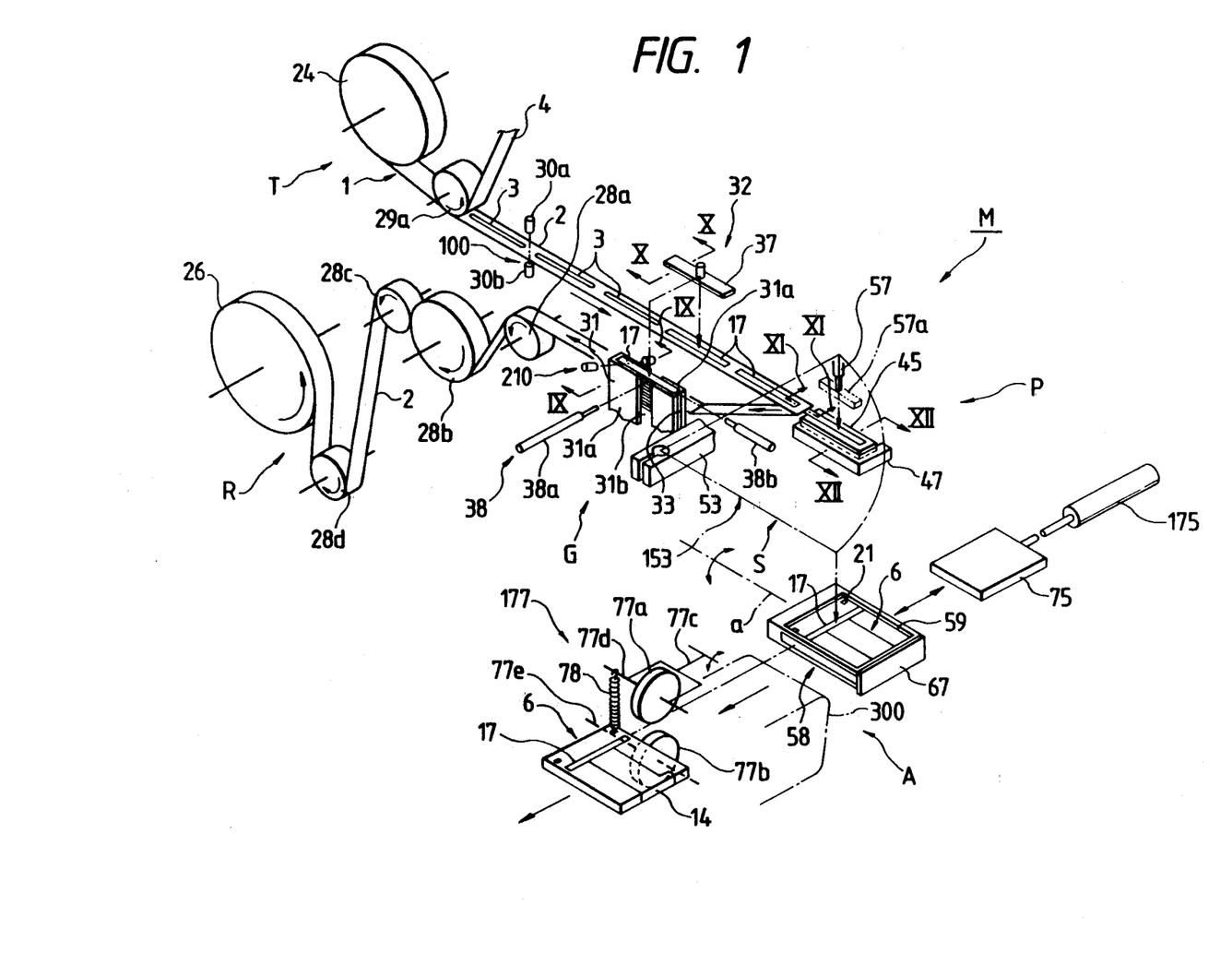
FIG. 1 is a structural view of a device for applying a guide plate onto a cartridge.

First, in FIG. 1, a device M for applying a guide plate 17 for guiding a shutter onto a disk cartridge has a tape supplying portion T for supplying a tape 1 having a plurality of adhesive pieces thereon, a guide plate supply portion G for supplying the guide plate onto an adhesive piece supported on a support sheet 2 of the tape 1, a guide plate peeling-off portion P for peeling off the guide plate 17 with the adhesive piece 3 from the support sheet 2, a support sheet recovery portion R for rewinding the support sheet 2, a guide plate transferring portion S for transferring the guide plate 17 from the guide plate peeling-off portion P to a position where a disk cartridge 6 is supplied, and a guide plate applying portion A for applying the guide plate onto the disk cartridge 6.

Figure 2:
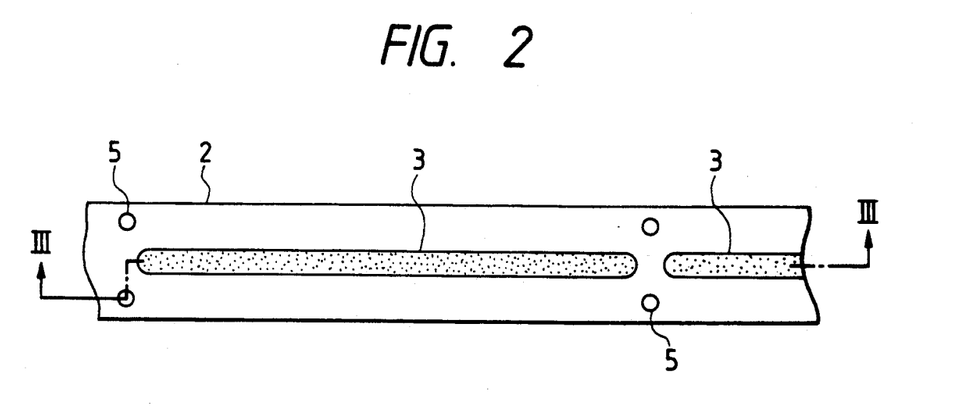
FIG. 2 is a plan view of a tape which is used in the device.
Figure 3:
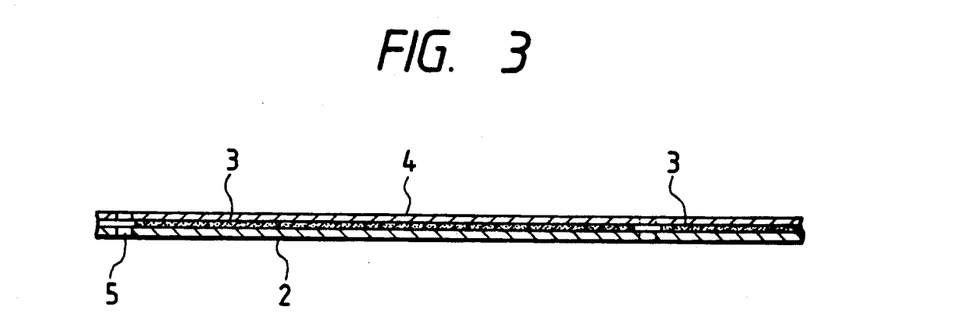
FIG. 3 is a sectional view taken along the line III—III in FIG. 2.

The tape supplying portion T has a tape supply reel 24 for supplying the tape 1 as shown in FIGS. 2 and 3. The tape 1 has a continuous support sheet 2 for supporting a plurality of adhesive pieces 3, 3—3 with a predetermined interval. Each of adhesive pieces 3 has adhesive on its front and back surfaces (referred to as a two-surface adhesive piece hereinafter), and the support sheet 2 has a separative (parting) property that it is easily peeled off from adhesive applied onto the piece 3. Further, the two-surface adhesive piece 3 has an elongated shape in which pressure-sensitive adhesive is applied onto both surfaces of a thin plastic film. A separative sheet 4 is attached to the support sheet 2 in a state wherein the two-surface adhesive pieces 3 are held between the both sheets 2, 4. The separative sheet 4 has a property more separative than that of the support sheet 2. Therefore, the separative sheet 4 can be peeled off from the support sheet 2 with the two-surface adhesive pieces left onto the surface of the support sheet 2. That is, the separative sheet 4 is finished more smoothly than the support sheet 2. The support sheet 2 and the separative sheet 4 are made of transparent material and the two-surface adhesive piece 3 is made of semi-transparent or intransparent material. The tape 1 has a plurality of marginal punch holes 5, 5—5 on the opposite sides in its widthwise direction at positions between the two-surface adhesive pieces 3

Figure 4:
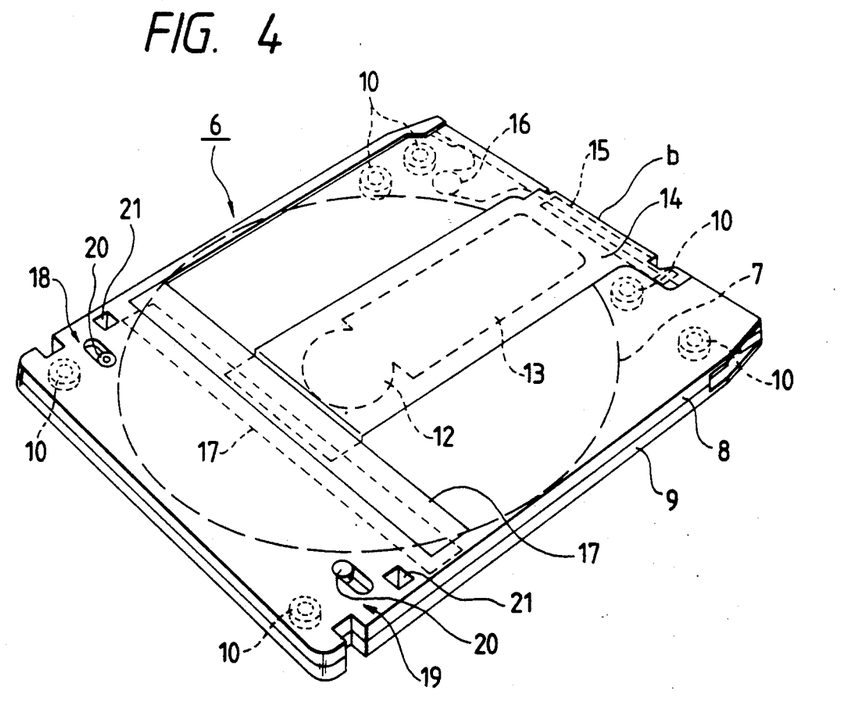
FIG. 4 is a perspective view of the cartridge.
Figure 5:
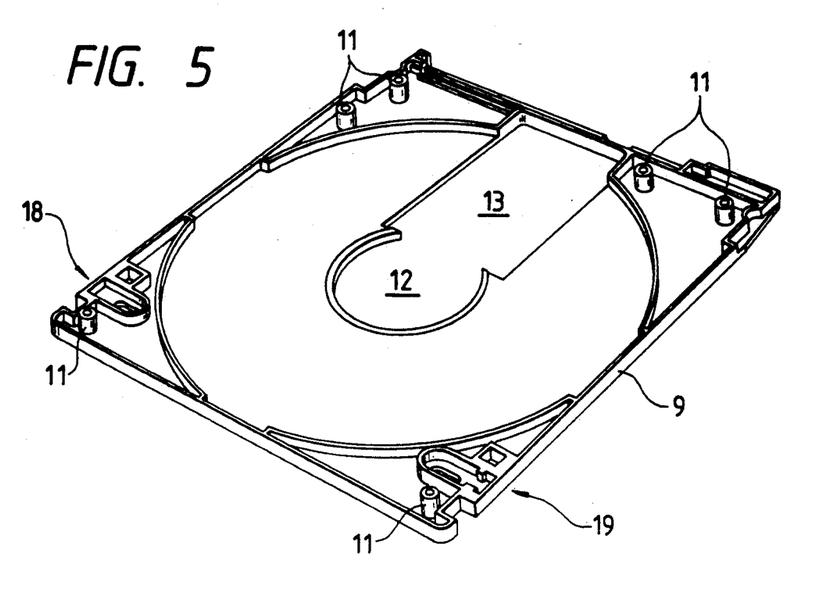
FIG. 5 is a perspective view of a lower half piece of the cartridge.

On the contrary, the two-surface adhesive piece 3 is applied onto the cartridge 6 whose construction is shown in FIGS. 4 and 5. The cartridge 6 has an upper half piece 8 and a lower half piece 9 for accommodating a disk 7 such as an optical disk, a magnetic disk or the like therebetween. The two half pieces 8, 9 are made of polycarbonate resin or acrylonitrile-butadrine-styrene (ABS) resin, and provided, along their peripheral walls, with a plurality of engaging recesses 10, 10—10 and engaging projections 11, 11—11 opposed to each other. The two half pieces 8, 9 are assembled integrally with the disk 7 held therebetween by engaging the projections 11 with the recesses 10. The cartridge 6 has a center hole 12 which receives a spindle of a player (not shown) for rotating the disk 7 and a rectangular hole 13 adjacent to the center hole 12 for receiving a writing/reading head (not shown).

These two holes 12, 13 are covered with a shutter 14 provided slidably on the cartridge 6. The shutter 14 is made of thin metal plate which is formed in a U-shape, and its bent portion b is connected to a slider 15 which is received slidably in the end face of the cartridge 6 and which is made of slippery polyacetal series resin or fluorine series resin.

Close to the slider 15 is provided a spring 16 whose one end is engaged with the front end of the slider 15 while whose other end is engaged with the front corner of the cartridge 6 thereby to urge the shutter 14 in the direction where the two holes 12, 13 of the cartridge 6 are closed with the shutter 14. The shutter 14 is slidably moved in the widthwise direction of the cartridge 6 while two distal ends of the shutter 14 are guided by two guide plates 17, 17 provided on the upper and lower half pieces 8, 9. The two guide plates 17 are attached to the respective surfaces of the upper and lower half pieces 8, 9 by means of the above mentioned two-surface adhesive pieces 3.

The cartridge 6 has a pair of write protection mechanisms 18, 19 provided on the opposite sides, in its widthwise direction thereof, close to the guide plates 17. Each of write portection mechanisms 18, 19 has a movable plug 20 which is moved by a user in one direction when a writing process is prohibited and which is moved by the user in the other direction when the writing process is permissible. Between the write protection mechanisms 18, 19 and the guide plates 17 are formed two locating openings 21, 21 into which two corresponding pins (not shown) of a player are inserted in order to locate the cartridge inserted (loaded) into the player at a predetermined position.

Figure 6:
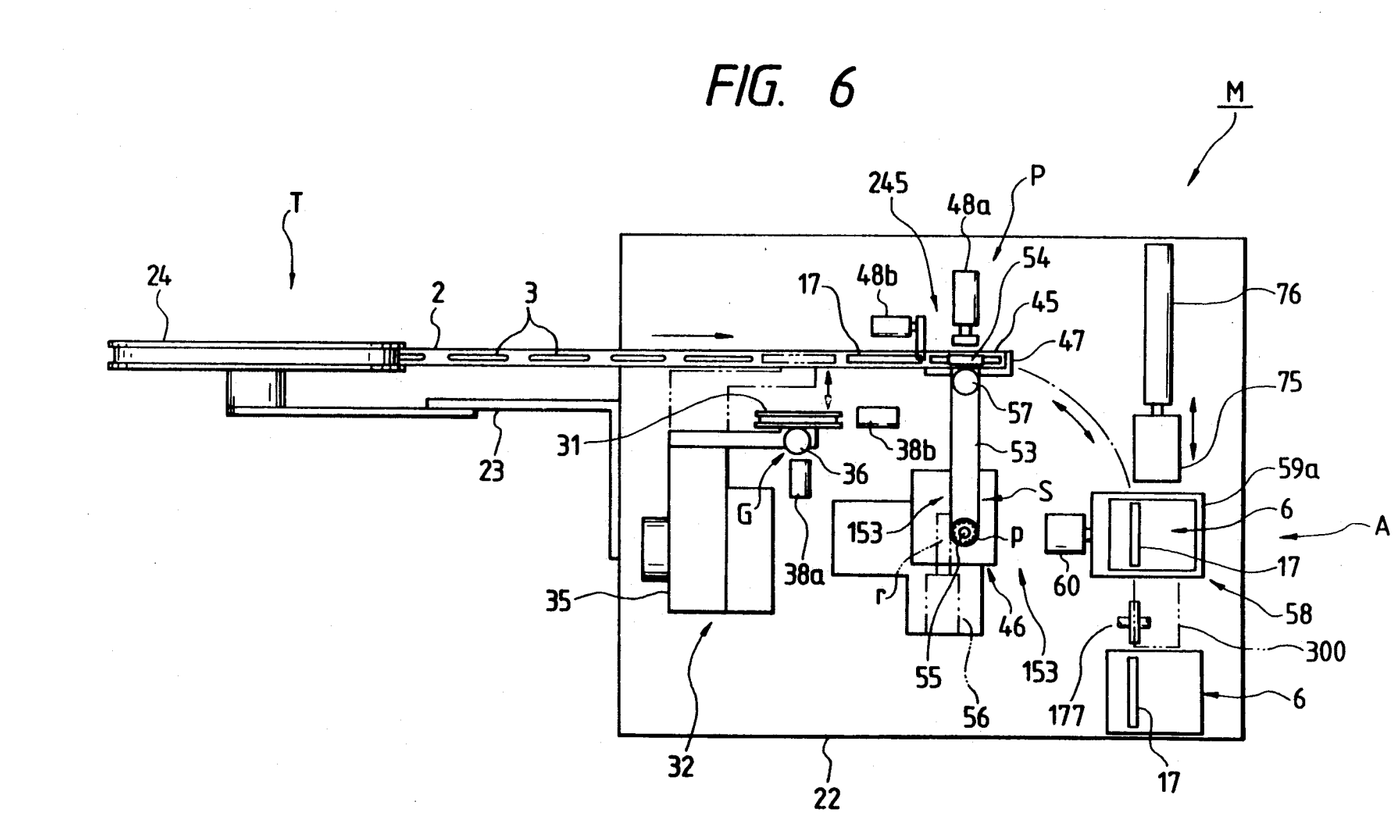
FIG. 6 is a plan view of the device for applying the guide plate onto the cartridge.
Figure 7:
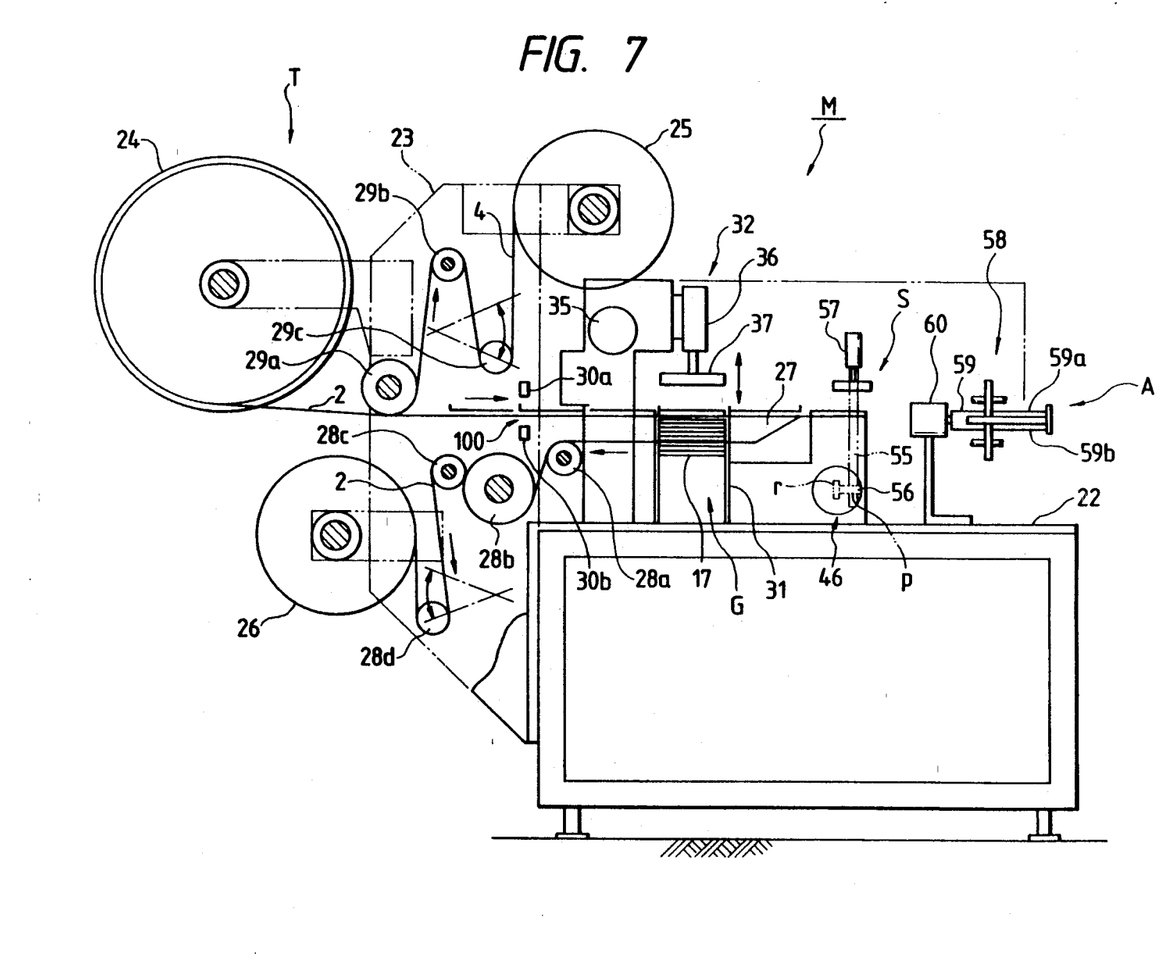
FIG. 7 is a side view of the device shown in FIG. 6.

In FIGS. 6 and 7, the device M has a horizontal base frame 22 and a vertical supporting flame 23 elongated vertically from one end of the horizontal base frame 22. At the upper portion of the vertical supporting frame 23 is vertically supported the tape supply reel 24 for supplying the tape 1 toward the guide plate supply portion G and a take-up reel 25 for rewinding the separative sheet 4, both of the reels 24, 25 being located separately in the direction of the tape running direction. At the lower portion of the vertical supporting frame 23 is vertically supported a take-up reel 26 for rewinding the support sheet 2 after each two-surface adhesive piece 3 is removed thereon. The running course of the support sheet 2 is returned at a turning member 27 toward the take-up reel 26, which is provided over the center position of the horizontal base frame 22. The support sheet 2 is guided by four rollers 28a, 28b, 28c, 28d provided, along the running course of the support sheet 2, between the turning member 27 and the take-up reel 26. The three rollers 28a, 28b, 28c function to guide the support sheet 2. However, the roller 28d is a dancer roller for pulling the support sheet 2 intermittently and removing slack of the support sheet 2. The tape 1 is supplied intermittently and the support sheet 2 is rewound by a predetermined pitch (length) at each time one swinging motion of the dancer roller 28d is performed.

Near the tape supply reel 24 is provided, along the running course of the tape 1, a separative roll 29a for peeling-off the separative sheet 4 from the support sheet 2. The separative sheet 4 is guided by a guide roller 29b and a dancer roller 29c to be rewound by the take-up reel 25. The dancer roller 29c is also swung to pull the separative sheet 4 intermittently. The two dancer rollers 28d, 29c are swung vertically synchronously with each other to send intermittently the support sheet 2 and the separative sheet 4 at a predetermined pitch to the guide plate supply portion G and to the take-up reel 25, respectively. In response to the motion of the dancer rollers 28d, 29c, the two take-up reels 26, 25 rewind the support sheet 2 and the separative sheet 4, respectively.

Figure 8:
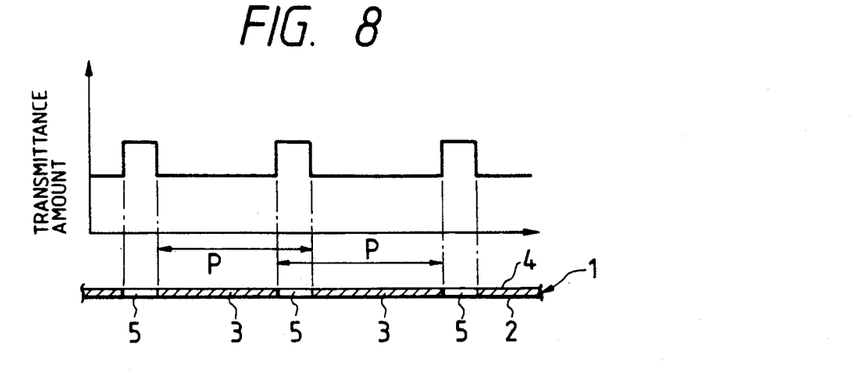
FIG. 8 is a explanatory view showing a controlling operation for moving a tape intermittently.

Close to the separative roller 29a for peeling-off the separative sheet 4 from the support sheet 2 is provided a sensor 100 for controlling the motion of the dancer rollers 28d, 29c. The sensor 100 comprises a light emitting element 30a and a light receiving element 30b. The light beam from the light emitting element 30a passes through the separative sheet 4, the two-surface adhesive piece 3, and the support sheet 2. As mentioned above, the support sheet 2 and the separative sheet 4 are made of transparent material while the two-surface adhesive piece 3 is made of non-transparent material. Therefore, transmittance amount of the light at a position where the two-surface adhesive piece is located on the support sheet 2 is different from that at a position where it is not located thereon. That is, when the sensor 100 detects a position where the light transmittance amount is decreased or increased as shown in FIG. 8, respectively, tape supply motion is started, and when the sensor 100 detects the next position where the light transmittance amount is decreased or increased, the tape supply motion is stopped, respectively. The length between the two positions is one pitch P of the tape supply.

The two-surface adhesive piece 3 may be made of transparent material if the existence of the piece can decrease the light transmittance amount.

Further, instead of detecting the change of the light transmittance amount by the sensor 100, a number of marks may be formed on positions corresponding to the pitches of the tape supply in order to detect the marks by a sensor.

Figure 9:
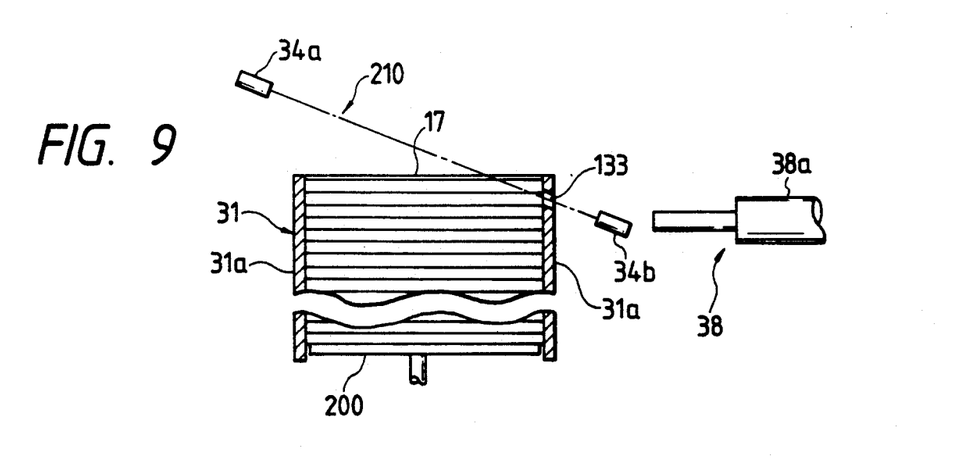
FIG. 9 is a sectional view taken along the line IX—IX.

At a downstream position of the sensor 100 is provided the guide plate supply portion G comprising a guide plate holding frame 31 mounted at a lateral position of the support sheet running course for holding a number of guide plates 17 piled up vertically and a first guide plate transferring device 32 for picking up the uppermost guide plate 17 to transfer it onto the two-surface adhesive piece 3. The guide plate holding frame 31 comprises two frames 31a, 31a located separately in an opposed manner so as to form two spaces 31b elongated vertically on the opposite sides of the longitudinal direction of the guide plate holding frame 31 (FIG. 1). A user can see the condition where each of the guide plates 17 is accommodated in the guide plate holding frame 31, and the spaces 31b receive his fingers when he supplies the guide plates 17 into the guide plate holding frame 31 and takes them out of the frame 31. An elevator 200 supports the piled up guide plates 17 in the guide plate holding frame 31 as shown in FIG. 9 and moves the guide plate 17 upward in response to the decrease of the number of the guide plates 17. The guide plate holding frame 31 has an opening at its upper face, and one of upper end walls has a slit 33 for receiving an air cylinder 38b after at its upper portion as shown in FIGS. 1 and 9. In FIG. 9, a guide plate existence detector 210 is provided for detecting existence of the guide plates 17 in the guide plate holding frame 31. The detector comprises a light emitting element 34a located over the left end wall of the frame 31, as viewed in FIG. 9, and a light receiving element 34b located at a position lower than the upper end of the right end wall of the frame 31, as viewed in FIG. 9, in the lateral direction thereof. The light beam emitted from the element 34a goes slantingly downwardly to the element 34b through a slanted hole 133 formed in a right side wall. If the uppermost guide plate 17 is located at an upper predetermined position where it is picked up by the guide plate transferring device 32, the light beam is cut off by the left end portion of the uppermost guide plate 17 thereby to allow the detector 210 to detect the presence of a guide plate 17 at a predetermined position. If the uppermost guide plate 17 piled up in the frame 31 or no guide plate 17 is located at the predetermined position, the elevator 200 moves the guide plates 17 upward to locate the uppermost guide plate 17 at the predetermined position. In this manner, as the uppermost guide plate 17 is removed from the upper position of the frame 31, the elevator 200 moves the uppermost guide plate 17 at its transferring position in response to a signal sent from the detector 210.

At the guide plate transferring portion G, a guide plate locating device 38 is provided for locating the uppermost guide plate 17 in position in the holding frame 31 (FIG. 1). The guide plate locating device 38 comprises an air cylinder 38a which is located, at a height position corresponding to the uppermost guide plate 17, in the lateral position of the longitudinal axis of the holding frame 31 and an air cylinder 38b, at a height position corresponding to the uppermost guide plate 17, in the longitudinal direction of the holding frame 31. The two air cylinders 38a, 38b are disposed perpendicular to each other. When the uppermost guide plate 17 is located in position, the lateral air cylinder 38a pushes the side face of the guide plate 17 onto the side wall, close to the support sheet running course of the holding frame 31 while the longitudinal air cylinder 38b pushes the end face of the guide plate 17 onto the end wall, on the upstream side of the support sheet running course, of the holding frame 31. The uppermost guide plate 17 located in position in this manner is transferred by the guide plate transferring device 32 therefrom onto the two-surface adhesive pieces supported by the support sheet 2 moved intermittently.

The guide plate transferring device 32 comprises, as shown in FIGS. 6 and 7, a first air cylinder 35 supported over the horizontal base 22 perpendicular to the running course of the support sheet 2, a second air cylinder 36 supported vertically at the front portion of the first air cylinder 35, and a vacuum head 37 fixed to the lower end of the second air cylinder 36. Therefore, the vacuum head 37 can be moved in the direction perpendicular to the running direction of the support sheet 2 and in the upward and downward direction.

Figure 10:
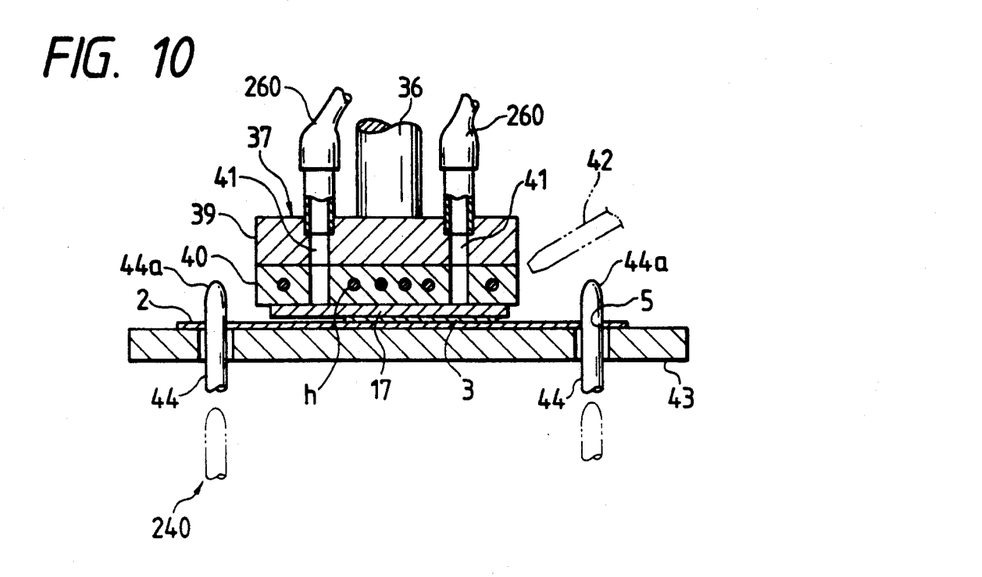
FIG. 10 is a sectional view taken along the line X—X in FIG. 1.

The vacuum head 37 has, as shown in FIG. 10, an electric heating plate 40 in which a plurality of heaters h, h—h are disposed and a base plate 39 for supporting the heating plate 40. The base and heating plates 39, 40 have a pair of suction holes 41, 41 which are open downward and whose upper ends are connected to two connecting pipes 260, 260 extended from a vacuum suction source (not shown), respectively. While the guide plate 17 is held by the heating plate 40 whose heating temperature can be adjusted, the guide plate 17 is pre-heated to increase adhesiveness of the guide plate 17 to the two-surface adhesive piece 3.

Instead of (or in addition to) the heating plate 40, a hot air nozzle 42 for blowing out hot air onto the piece 3 supported on the support sheet 2 may be disposed close to the support sheet running course.

The vacuum head 37 is first located over the holding frame 31 by the contraction of the two air cylinders 35, 36. Then, the second air cylinder 36 is expanded to lower the vacuum head 37 until the heating plate 40 contacts the uppermost guide plate 17 in the holding frame 31. At this time, the vacuum source is operated to suck up the guide plate 17 onto the heating plate 40. After the vacuum head 37 holds the guide plate 17, the second air cylinder 36 is contracted and the first air cylinder 35 is then expanded to locate the vacuum head 32 just over the support sheet running course. At this time, the two-surface adhesive piece 3 is located in position by inserting two pairs of pins 44, 44—44 into the marginal punch holes 5, 5—5. Two pairs of pins 44 are disposed to engage with the marginal holes 5 located in the front and back positions of the pieces 3. That is, the pins 44 form an adhesive piece locating device 240 as shown in FIG. 10, and are moved vertically in response to the intermittent movement of the support sheet 2 with the adhesive pieces 3 thereon. Each of the pins 44 has a round portion 44a at its top end, and the adhesive piece 3 sent to a portion close to a predetermined portion located by the pins 44 at a position in registration with the lowering course of the guide plate 17 supported by the heating plate 40.

With this state, the second air cylinder 36 positioned over the support sheet 2 is expanded to lower the vacuum head 37 onto the support sheet 2. When the guide plate 17 held by the heating plate 40 is pushed onto the two-surface adhesive piece 3, the vacuum source stops its operation. Therefore, the guide plate 17 is applied to the upper surface of the adhesive piece 3 located at position. After the guide plate 17 is attached to the adhesive piece 3, the vacuum head 32 is returned to the original position just over the holding frame 31.

Upon the completion of the attachment between the guide plate 17 and the adhesive piece 3, the two pairs of pins 44 are moved downward to permit the support sheet 2 to move forward by one pitch.

Figure 11:
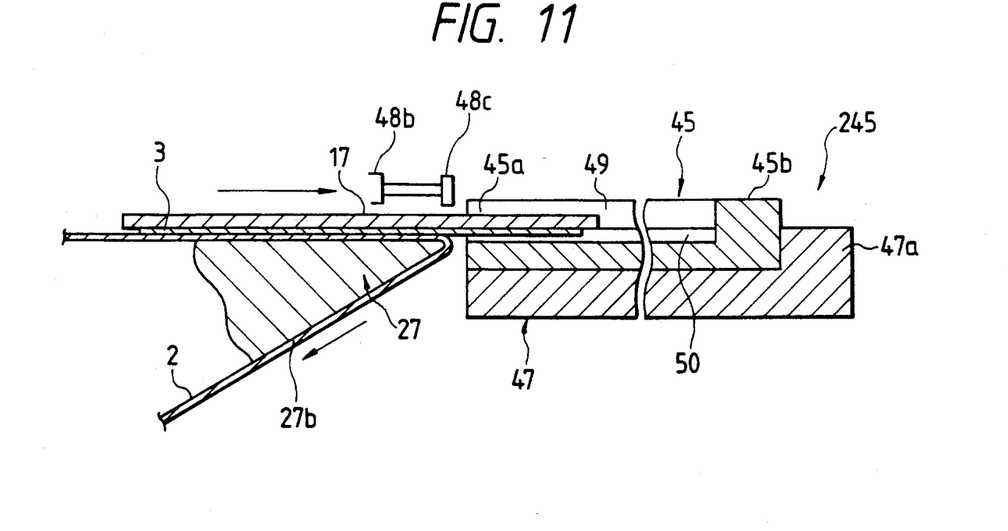
FIG. 11 is a sectional view taken along the line XI—XI in FIG. 1.
Figure 12:
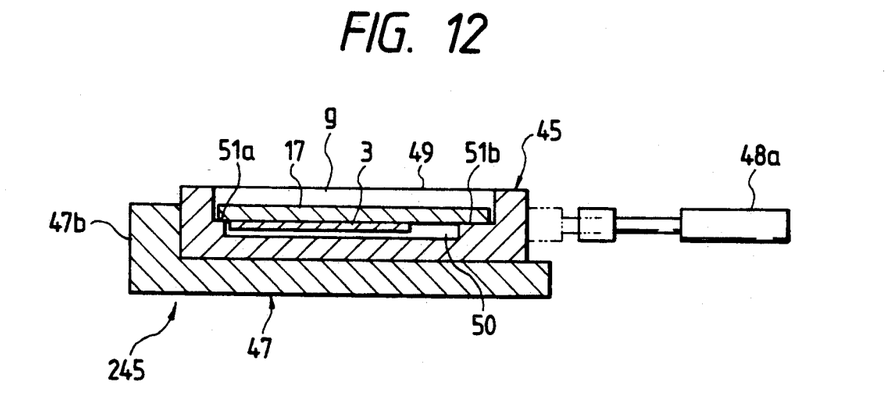
FIG. 12 is a sectional view taken along the line XII—XII in FIG. 1.

Adjacent to the adhesive piece locating device 240, the turning member 27 is disposed, as shown in FIGS. 7 and 11 in order to separate the support sheet 2 from the adhesive piece 3 attached to the lower surface of the guide plate 17. The turning member 27 has a sharp separation end 27a from which a slanting surface 27b is extended obliquely backwardly. The support sheet 2 is returned backward at the sharp separation end 27a and pulled intermittently by the dancer roller 28d (FIG. 7). In FIGS. 6, 11 and 12, a guide plate locating frame 245 is disposed adjacent to the sharp turning end 27a of the turning member 27 in the moving direction of the guide plate 17 in order to receive the guide plate 17 with the adhesive piece 3 on its lower surface. The frame 245 comprises a fixed base frame 47 having two upright walls 47a, 47b provided along the two sides of the frame 245, and a guide plate receiving frame 45 for receiving the guide plate 17 with the adhesive piece 3, separated from the support sheet 2. The frame 45 has an opening 45a on the side of the support sheet turning member 27 and an upright wall 45b abutting against the front end of the guide plate 17. The frame 45 has an approximately rectangular shape in which an elongated receiving groove g is formed to receive the guide plate 17 in the horizontal direction. The groove g has two steps 51a, 51b on the opposite sides of the longitudinal axis of the frame 45 so that the guide plate 17 is received in an upper large groove 49 in a state wherein the opposite sides of the guide plate 17 in its widthwise direction are supported on the steps 51a, 51b, respectively, and wherein the adhesive piece 3 attached onto the lower surface of the guide plate 17 is received in a lower small groove 50. The width of the upper large groove 49 is slightly larger than that of the guide plate 17.

As the adhesiveness between the upper surface of the adhesive piece 3 and the guide plate 17 is larger than that between the lower surface of the adhesive piece 3 and the support sheet 2, the adhesive piece 3 is separated from the support sheet 2 at the support sheet turning member 27. The separated guide plate 17 is received horizontally into the receiving groove g. At this time, the guide plate 17 is moved slidably at its widthwise ends contacting the steps 51a, 51b into the groove g in a condition wherein the adhesive piece 3 is in a floating manner without contacting anything.

Near the guide plate locating device 245 are provided two air cylinders 48a, 48b as shown in FIGS. 6, 11 and 12 for locating the receiving frame 45 in position in the base frame 47. A first air cylinder 48a is disposed in the lateral position of the two frames 45, 47 so as to push the receiving frame 45 toward the upright wall 47b of the base frame 47 while a second air cylinder 48b is disposed on the upstream side of the frames 45, 47 in the moving direction of the guide plate 17 so that a pushing plate 48c fixed to the second air cylinder 48b pushes the receiving frame 45 toward the upright wall 47a of the base frame 47. The pushing plate 48c is positioned over the moving course of the guide plate 17 so as not to obstruct the movement of the guide plate 17.

Figure 13:
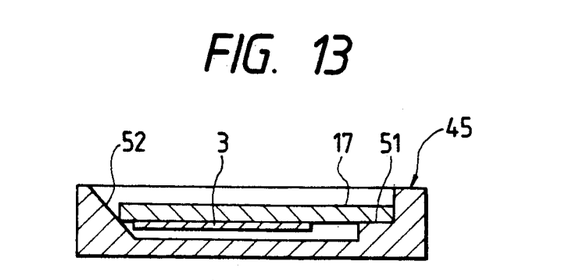
FIG. 13 is another example of a receiving frame for receiving the guide plate.

The adhesive piece 3 is attached to the guide plate 17 in a position deviated from the longitudinal axis thereof so as to form a sliding surface of 0.5 mm on th widthwise one end of the guide plate 17. Therefore, the step 51a on which the sliding surface 17a is supported must have a small width, thereby making its formation difficult. In view of this, instead of the step 51a, a slanted surface 52 may be formed as shown in FIG. 13. An agent such as silicon for avoiding adhesion of the adhesive piece 3 onto the slanted surface 52 is preferably applied to the slanted surface 52. This slanted surface 52 facilitates the formation of the receiving frame 45, and the guide plate 17 with the adhesive piece 3 can be guided smoothly into the opening 45a of the receiving frame 45.

Over the guide plate locating device 245 is disposed, as shown in FIGS. 1 and 7, a vertical air cylinder 57 having a vacuum head 57a, similar to the base plate 39 as shown in FIG. 10, for holding the guide plate 17 with the adhesive piece 3. The air cylinder 57 is fixed to the distal end of a swinging arm 53 (FIG. 1) which swings horizontally through 90 degrees to transfer the guide plate 17 in the guide plate locating device 245 to the guide plate applying portion A for applying the guide plate 17 onto the front and back surfaces of the cartridge 6. The swing arm 53, air cylinder 57, etc., form a second guide plate transferring device 153. The swing arm 53 is swung about a swinging axis 55 (FIGS. 6 and 7). The guide plate 17 located in position in the receiving frame 45 is sucked up by the suction plate 57a (FIG. 1) which is lowered when the swinging arm 53 is in a first position where the air cylinder 57 is positioned just over the guide plate locating device 245. The axis 55 has a pinion p for engaging with a rack r operated by an air cylinder 56 (FIGS. 6 and 7). When the suction plate 57a holds the guide plate 17, the air cylinder 57 is contracted to raise the guide plate 17 by a predetermined distance. The swinging arm 53 is then rotated by 90 degrees in the clockwise direction, as viewed in FIG. 1, to transfer the guide plate 17 to a second position just over the guide plate applying portion A by operating the air cylinder 56.

In the guide plate applying portion A, a cartridge supporting device 58 is provided for supporting the cartridge 6 supplied by an operator. The cartridge supporting device 58 comprises, as shown in FIGS. 1, 14 to 16, a support frame 59 having a flat rectangular shape for receiving the cartridge 6 thereinto, two opening and closing mechanisms 162, 163 for opening and closing two opposite side faces i.e. of the support frame 59, an opening and closing mechanism 167 for opening and closing cartridge supply inlet h of the support frame 59, and a cartridge locating mechanism 71 for locating the cartridge 6 in position in the support frame 59.

Figure 14:
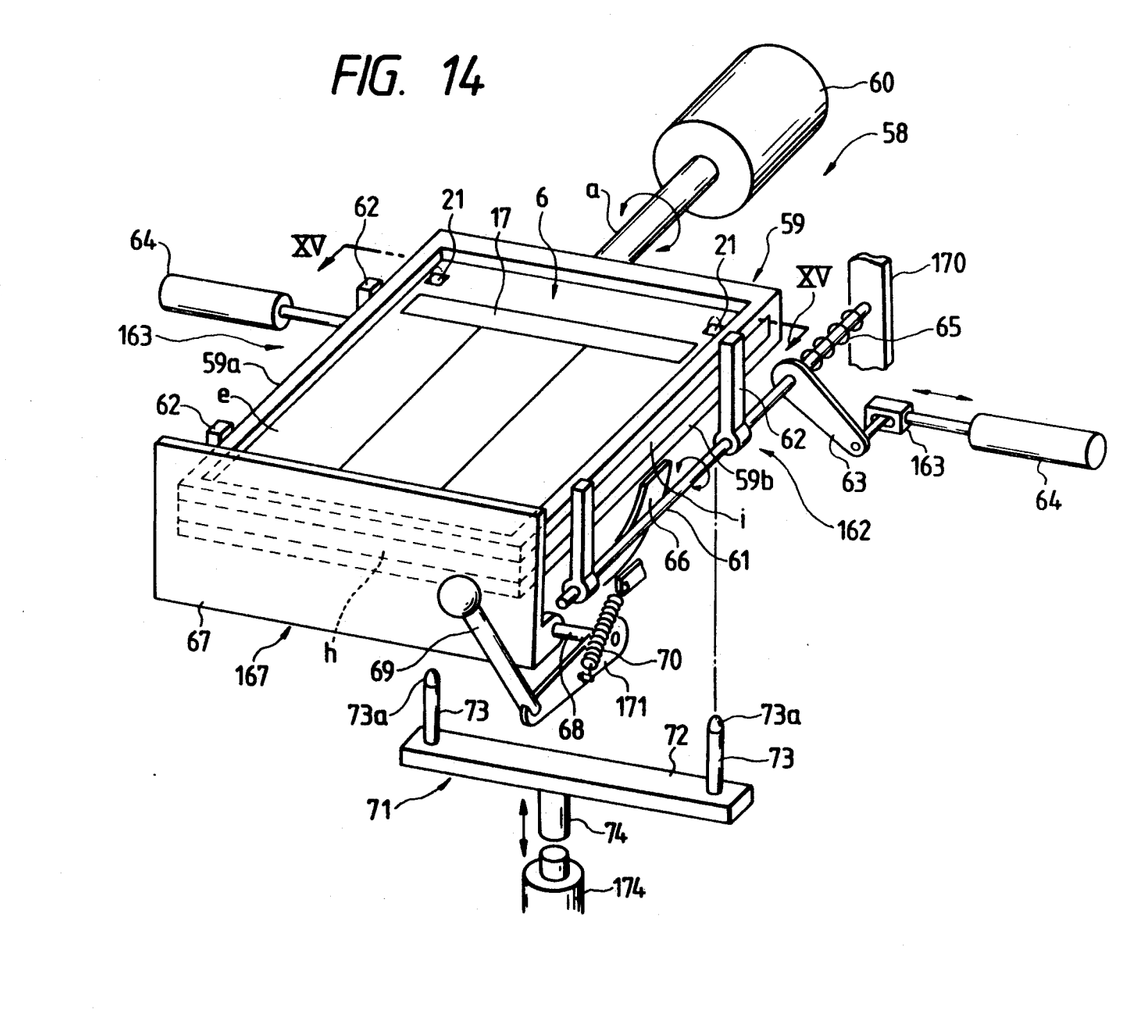
FIG. 14 is a perspective view of a cartridge support device.

The support frame 59 has an upper frame 59a and a lower frame 59b opposed to the upper frame 59a, and the upper and lower frames 59a, 59b are assembled so as to receive the cartridge 6 thereinto in a state wherein its side faces are open to form two openings and its one end face is open outward to form the cartridge supply inlet h through which the cartridge 6 is inserted into the support frame 59. The support frame 59 is supported, at the other end face, by a support axis a which is connected to a reversible motor 60 to thereby enable upside-down motion of the support frame 59.

The two side face opening and closing mechanisms 162 and 163 have the same construction. Therefore, only the construction of the mechanism 162 will be explained. The mechanism 162 has a rotating axis 61 disposed in parallel with the side face of the support frame 59. To the rotating axis 61 at a predetermined interval are fixed a pair of swinging arms for closing and opening the side face of the support frame 59. The rotating axis 61 is rotatably supported at its one end by a vertical supporting frame 170. A lever 63 is fixed to an intermediate position between the supporting plate 170 and one of the swinging arms 62. The distal end of the lever 63 is connected to a connecting member 163 fixed to the rod of an air cylinder 64 so as to swing the swinging arms 62 to open and close the side face of the support frame 59.

The cartridge supply inlet opening and closing mechanism 167 has an inlet door plate 67 which is disposed along the end face of the support frame 59 and which is rotated about an axis 68 provided at the lower end of the side face of the inlet door plate 67. The axis 68 is rotatably supported by a fixed frame (not shown) and a lever 171 is fixedly connected to one end of the axis 68. The lever 171 is urged by a coil spring 70 in the direction where the door plate 67 closes the cartridge supply inlet h. To the distal end of the lever 171 is connected the lower end of a handle 69 operated by the operator. The coil spring 70 functions as a turnover spring. That is, until the door plate 67 is rotated through a predetermined angle, the spring 70 urges the lever 170 to rotate in the direction where the door plate 67 closes the cartridge supply inlet h. However, when the door plate 67 is rotated over a certain angle, the coil spring 70 urges the lever 170 to rotate in the direction where the door plate 67 opens the cartridge supply inlet h and maintains the door plate 67 in an opening position.

Figure 16:
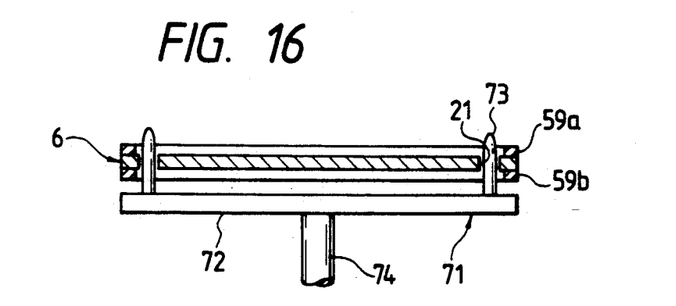
FIG. 16 is a explanatory view showing a state wherein a cartridge locating mechanism is operated.

The cartridge locating mechanism 71 comprises a base plate 72 disposed horizontally below the support frame 59 in parallel with the end faces of the support frame 59. The base plate 72 is provided, at its opposite ends, with a pair of locating pins each having a round portion 73a at its upper end. The base plate 72 is supported, at its center portion, by a support rod 74 which is moved vertically reciprocally by an air cylinder 174. In a state where the door plate 67 is opened, the operator insert the cartridge 6 through the cartridge supply inlet h and, then, the door plate 67 closes the cartridge supply inlet h. At this time, as shown in FIG. 16, the cartridge locating mechanism 71 is moved upward until the two locating pins 73 are inserted into the locating openings 21, 21 of the cartridge 6 thereby locating the cartridge 6 in position in the support frame 59. When the cartridge 6 is located in position in the support frame 59, the guide plate 17 supported by the suction head 57a is attached to the surface of the cartridge 6.

Under the support frame 59 is provided a semi-circular support member 66 for preventing the cartridge 6 in the support frame 59 from dropping through the open side faces of the support frame 59 when the support frame 59 is rotated upside down. The opposite upper ends 66a, 66a are positioned so as not to close the open side faces of the support frame 59.

Figure 15:
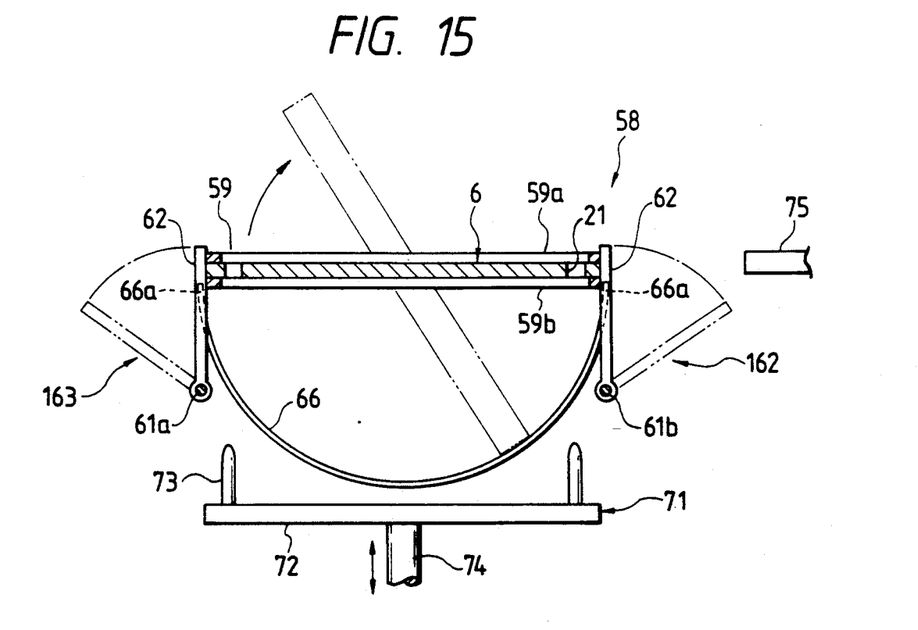
FIG. 15 is a sectional view taken along the line XV—XV in FIG. 14.

On the right side of the support frame 59, as viewed in FIGS. 1 and 15, there is provided a pushing plate 75 for moving reciprocally to push out the cartridge 6, onto the two surfaces of which two guide plates 17 have already been attached, respectively, from the support frame 59 with the side faces of the support frame 59 being opened toward a conveyor 300.

On the left side of the support frame 59, there is provided a pair of pressure rolls 77a, 77b as pressure means 77 disposed vertically midway of the conveyor 300 for pressing the two guide plates 17 on the both surfaces of the cartridge 6 in order to attach reliably the guide plates 17 onto the surfaces of the cartridge 6. The pressure rolls 97a, 97b are disposed along the locus of the movement of the guide plates 17 so as to push the guide plates 17 therebetween from above and below.

An upper pressure roll 77a is supported by a support frame 77c so as to be moved upward and downward. A spring 78 is provided between the axes 77d, 77e of the respective the upper and lower pressure rolls 77a, 77b to urge them to move close to each other (FIG. 1).

The operation of the device M according to this invention will now be explained.

The tape 1 is pulled out of the tape supply roll 24 intermittently by the swinging motion of the dancer rollers 28d, 29c while the separative sheet 4 is separated from the support sheet 2 with a plurality of the two-surface adhesive pieces 3. When a two-surface adhesive piece 3 on the support sheet 2 reaches the guide plate supply portion G, the support sheet 2 stops running and the adhesive piece locating device 240 is operated so that the pins 44 are inserted into the four marginal holes 5 provided in front and back positions of the piece 3 thereby locating the piece 3 at position. In synchronism with the intermittent movement of the support sheet 2, the guide plate transferring device 32 transfers the uppermost guide plate 17 in the holding frame 31 just over the piece 3 while the guide plate 17 is pre-heated. The vacuum head 37 holding the guide plate 17 is lowered to push the guide plate 17 onto the piece 3. At this time, since the guide plate 17 is pre-heated at a proper temperature, the guide plate 17 is attached onto one adhesive surface of the piece 3. Upon completion of the attachment between the piece 3 and the guide plate 17, the suction source is cut off to separate the guide plate 17 from the suction head 37 and the suction head 37 is returned to hold the next uppermost guide plate 17 supported by the elevator 200.

When the guide plate 17 is released from the suction head 37, the support sheet 2 is moved forward by one pitch. At this time, a forward guide plate 17 on the turning member 27 passes by the sharp separation end 27a to be guided into the groove g of the guide plate locating frame 245 while the support sheet 2 is separated from the adhesive piece 3 attached to the lower surface of the guide plate 17.

After the guide plate 17 is moved completely in the receiving frame 45, the receiving frame 45 is pushed by the two air cylinders 48a, 48b to locate the receiving frame 45 in position on the fixed base frame 45. The guide plate 17 located in position in this manner is then transferred by the second plate transferring device 153 to the position just over the support frame 59 in its horizontal position of the cartridge supporting device 58. Before this, the door plate 67 is swung by operating the handle 69 to open the cartridge inlet h. The cartridge 6 is then inserted into the support frame 59 with a state wherein the swinging arms 62 close the opposite side faces and, thereafter, the inlet h is closed with the door plate 67. At the same time, the cartridge locating mechanism 71 is operated so that the locating pins 73 are inserted into the locating holes 21 formed in the cartridge 6. With this state, the suction head 57a holding the guide plate 17 with the piece 3 on its lower surface is lowered to push the guide plate onto a position near the locating holes 21 of the front surface of the cartridge 6. As soon as the guide plate 17 is attached to one surface of the cartridge 6, the suction head 57a releases the guide plate 17 to return to take up a next new guide plate 17 having been located in the receiving frame 45. In addition to this, the cartridge locating mechanism 71 moved downward to release the cartridge 6. While the suction head 57a is moved to take up the new guide plate 17 and returned to the position just over the support frame 59, the reversible motor 60 is operated to rotate the support frame 59 upside down through 180 degrees and to stop it in its horizontal position. When the support frame 59 is rotated, the semi-circular support member 66 maintains the cartridge 6 in the support frame 59 to avoid dropping of the cartridge 6. Thereafter, the cartridge locating mechanism 71 is operated again and the next guide plate 17 is attached to the back surface of the cartridge 6.

After the two guide plate 17 are attached onto the front and back surfaces of the cartridge 6, the side face opening and closing mechanisms 162, 163 are operated to open the opposite side faces and the pushing plate 75 is inserted through the end face i into the support frame 59 to push out the cartridge 6 from the end face e to the conveyor 300. The guide plate 17 on the conveyor 300 is passed by the pressure rollers 77a, 77b thereby pushing the guide plates 17 onto the surfaces of the cartridge.

According to this device M, only the operation in which the cartridge 6 is supplied into the support frame 59 is manually performed and other operations are automatically performed. Therefore, parts such as guide plate 17 and other members can be attached onto the surfaces of the cartridge in a short time with a low cost.

Figure 17:
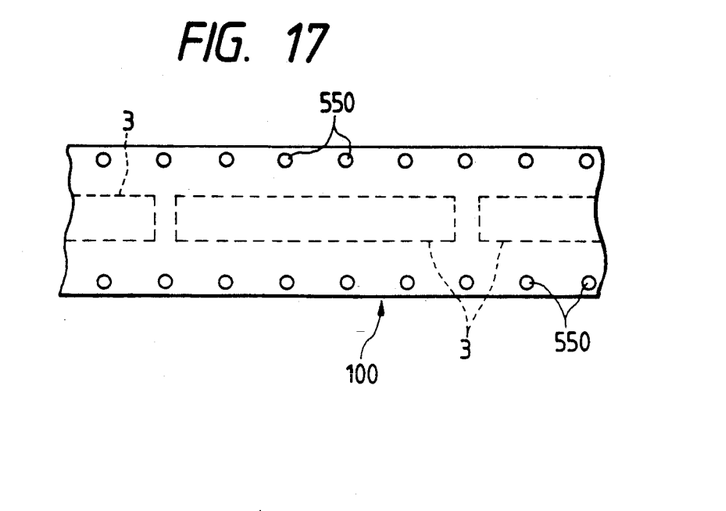
FIG. 17 is another example of a tape.

FIG. 17 shows another embodiment of a tape 100. In this case, the tape 100 has a number of marginal punch holes 550, 550—550 at a predetermined pitch. The holes 550 function to locate the adhesive pieces 3 in position and transfer the tape 100. That is, respective one of rollers for transferring the separative sheet 4 and the support sheet 2 may have a plurality of pins for engaging with the marginal holes 550 to transfer the separative sheet 4 and the support sheet 2. If the pin rollers are formed as driving rollers, the dancer rollers are not necessary.

The device M can use for applying any parts onto other products in addition to the cartridge 6.

What is claimed is:

1. An apparatus for applying a part onto a cartridge, comprising:
    a) a tape having a plurality of two-surface adhesive pieces thereon being transferred along a path;
    b) applying means for applying a part onto one surface of a two-surface adhesive piece;
    c) separating means for separating the part from the tape with the two-surface adhesive piece attached at a lower surface of the part;
    d) support means for supporting a cartridge in an affixing position and for rotating the cartridge upside down and returning the cartridge to said affixing position; and
    e) affixing means for holding the part, having the two-surface adhesive piece on its lower surface to affix the part onto the cartridge held in the support means.

2. An apparatus according to claim 1, wherein said part applying means comprises a part holding member for supplying parts piled up vertically, and a part transferring device for picking up the uppermost part in said part holding member to transfer the part to a position where the part is attached onto the two-surface adhesive piece located, in position, by a piece locating device.

3. An apparatus according to claim 2, wherein said part transferring device has a heating means for preheating the part while the part is held.

4. An apparatus according to claim 1, wherein said two-surface adhesive piece is supported by a continuous support sheet which is covered with a separative sheet with said two-surface adhesive piece being held therebetween, the support sheet having marginal holes for cooperating with a piece locating device to locate said two-surface adhesive piece in position.

5. An apparatus according to claim 4, wherein said support sheet with said two-surface adhesive piece is moved intermittently by one pitch at one time in response to a signal sent from a sensor for sensing the pitch of disposition of said two-surface adhesive on the support sheet.

6. An apparatus according to claim 1, wherein said separating means comprises a turning separation member for separating the support sheet from the part with the piece, and a part locating device disposed adjacent to the turning separation member for receiving the part with the piece to locate the part in position.

7. An apparatus according to claim 1, said cartridge supporting means comprising:
    a support frame having a rectangular shape whose two side faces opposite to each other and one end face located between said two side faces are opened and closed, respectively;
    rotating means provided on a remaining end face of the support frame for rotating the same upside down; and
    wherein the cartridge is supplied through the one end face into the support frame, the cartridge, onto which at least one part has been attached, being pushed by a pushing member through one side face to push out the cartridge through the other side face.

8. An apparatus according to claim 1, further comprising:
    pressure means for pressing onto at least one part attached onto the cartridge after the cartridge is moved out from said cartridge supporting means.

9. An apparatus according to claim 2, wherein the piece locating device comprises a pair of pins which are moved vertically in response to an intermittent movement of the tape supporting the two-adhesive pieces, the pins being disposed to engage with a plurality of marginal holes formed on the tape that are located between the pieces on the tape.

10. An apparatus according to claim 2, wherein the part holding member is provided with a part detector for detecting presence of the part therein.

11. An apparatus according to claim 2, wherein the part holding member is provided with a part locating device for locating, in position, an uppermost part piled up in the part holding member.

12. An apparatus according to claim 6, wherein the part locating device comprises a part locating frame disposed in a moving direction of the part with the piece on its lower face, the part locating frame having a part receiving frame provided with a part receiving groove for receiving the part in a non-contact state of the two-surface adhesive tape.

13. An apparatus according to claim 1, wherein said affixing means comprises a swing arm for transferring the part with the piece separated from the tape to said support means and a vacuum head supported on the swing arm for holding the part.

14. An apparatus according to claim 7, wherein said cartridge supporting means further comprises cartridge locating means for locating the cartridge in position in the support frame.

* * * * *